(12) United States Patent
Jain et al.

(10) Patent No.: US 11,392,613 B2
(45) Date of Patent: Jul. 19, 2022

(54) SYSTEMS AND METHODS FOR PROBABILISTIC BLOCKCHAINS

(71) Applicants: Raj Jain, St. Louis, MO (US); Tara Thaer Salman, St. Louis, MO (US)

(72) Inventors: Raj Jain, St. Louis, MO (US); Tara Thaer Salman, St. Louis, MO (US)

(73) Assignee: Washington University, St. Louis, MO (US)

( * ) Notice: Subject to any disclaimer, the term of this patent is extended or adjusted under 35 U.S.C. 154(b) by 160 days.

(21) Appl. No.: 16/671,780

(22) Filed: Nov. 1, 2019

(65) Prior Publication Data

US 2020/0142905 A1    May 7, 2020

Related U.S. Application Data

(60) Provisional application No. 62/754,240, filed on Nov. 1, 2018.

(51) Int. Cl.
*G06F 16/27* (2019.01)

(52) U.S. Cl.
CPC .................................. *G06F 16/27* (2019.01)

(58) Field of Classification Search
CPC .. G06F 16/27; G06Q 2220/00; G06Q 20/065; G06Q 20/4016
USPC ....................................................... 707/748
See application file for complete search history.

(56) References Cited

U.S. PATENT DOCUMENTS

| 9,875,510 | B1 | 1/2018 | Kasper |
| 9,998,286 | B1 | 6/2018 | Ramathal |
| 2017/0046689 | A1 | 2/2017 | Lohe et al. |
| 2017/0255950 | A1 | 9/2017 | Krug |
| 2017/0330174 | A1 | 11/2017 | DeMarinis et al. |
| 2018/0060771 | A1 | 3/2018 | Mangin |
| 2018/0102013 | A1 | 4/2018 | Spanos et al. |
| 2018/0122006 | A1 | 5/2018 | Kraemer |
| 2018/0157825 | A1 | 6/2018 | Eksten |
| 2018/0158158 | A1 | 6/2018 | Coogan-Pushner |
| 2019/0132350 | A1* | 5/2019 | Smith ................. G06F 16/2379 |
| 2019/0379699 | A1* | 12/2019 | Katragadda ............ G06N 3/006 |
| 2020/0273578 | A1* | 8/2020 | Kutzko .................. G16H 50/30 |

* cited by examiner

*Primary Examiner* — Michael Pham
(74) *Attorney, Agent, or Firm* — Armstrong Teasdale LLP

(57) ABSTRACT

A method for constructing blocks to a probabilistic blockchain is provided. The method includes receiving a plurality of transactions from a plurality of agents. Each transaction of the plurality of transactions includes a confidence rating. The method also includes generating a summary based on the plurality of confidence ratings associated with the plurality of transactions. The method further includes generating a block based on the summary and the plurality of transactions. Moreover, the method includes transmitting the block to a plurality of nodes for verification. If the block is verified, the method also includes adding the block to the probabilistic blockchain.

19 Claims, 7 Drawing Sheets

---

Stage 1: Transactions' Collection
Collect transactions that represent decisions from several agents for several files

Stage 2: Block Proposal
The miner constructs a proposed block including all transactions and calculating the consensus of files

Stage 3: Block Approval
The blockchain nodes validate the proposed block by verifying the consensus and add it to the blockchain

Stage 4: Block Commitment
Once a certain number of blocks have been added following a particular block, the block is considered committed and can be used for decision making.

«SYSTEMS AND METHODS FOR PROBABILISTIC BLOCKCHAINS»

CROSS REFERENCE TO RELATED APPLICATIONS

This application claims the benefit of priority to U.S. Provisional Patent Application No. 62/754,240, filed Nov. 1, 2018, entitled "SYSTEMS AND METHODS FOR PROBABILISTIC BLOCKCHAINS," the entire contents and disclosure of which are incorporated by reference in its entirety.

BACKGROUND

The field of the invention relates generally to blockchains, and more specifically to using probabilistic blockchains for decision-making applications.

There are several massively collaborative applications where the participating entities do not necessarily trust each other and may possibly be competitive. These are called multi-trust domain applications. An example of a multi-trust domain is the current banking systems. The banks do not necessarily trust each other and, therefore, need the services of a centralized trustworthy organization, called SWIFT (Society for Worldwide Interbank Financial Telecommunication), to transact. This introduces delays and additional costs.

An alternative solution in a multi-trust system is to distribute the decision process among entities that do not necessarily trust each other. Blockchains can meet this objective efficiently and securely. Blockchains allow the parties to collaborate and exchange information based on consensus rather than mediation by a centralized trusted authority. The distributed architecture and continuous updating make a blockchain platform provably secure against attackers who try to control the decision traditionally achieved with centralized controllers.

Due to its distributed and decentralized consensus nature, blockchain technology has gained immense interest in several financial and non-financial applications. A blockchain provides a secure and distributed peer-to-peer network in which no trusted central party is required. As a result, blockchain technology has been viewed as having the potential to resolve many challenges with current centralized controllers in globally distributed applications. To date, the blockchain technology has been used for recording transactions and tracking objects. The probabilistic extension disclosed here provides the blockchain with the capability of building efficient and distributed decision-making applications in which multiple untrusting participants collaborate.

BRIEF DESCRIPTION

In one aspect, a method for adding blocks to a probabilistic blockchain is provided. The method includes receiving a plurality of transactions from a plurality of agents. Each transaction of the plurality of transactions includes a confidence rating. The method also includes generating a summary based on the plurality of confidence ratings associated with the plurality of transactions. The method further includes generating a block based on the summary and the plurality of transactions. Moreover, the method includes transmitting the block to a plurality of blockchain nodes for verification. If the block is verified, the method also includes adding the block to the probabilistic blockchain.

In another aspect, a system for adding blocks to a probabilistic blockchain is provided. The system includes a mining computer device including at least one processor in communication with at least one memory device. The mining computer device is in communication with a plurality of node computing devices. The at least one memory device includes instructions, which when executed by the at least one processor the instructions cause the at least one processor to receive a plurality of transactions from a plurality of agent computer devices. Each transaction of the plurality of transactions includes a confidence rating. The instructions also cause the at least one processor to generate a summary based on the plurality of confidence ratings associated with the plurality of transactions. The instructions further cause the at least one processor to generate a block based on the summary and the plurality of transactions. In addition, the instructions cause the at least one processor to transmit the block to the plurality of node computing devices for verification. If the block is verified, the instructions also cause the at least one processor to add the block to the probabilistic blockchain.

BRIEF DESCRIPTION OF THE DRAWINGS

The Figures described below depict various aspects of the systems and methods disclosed herein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

DETAILED DESCRIPTION OF THE INVENTION

The field of the invention relates generally to probabilistic blockchains, and more specifically to using probabilistic blockchains for decision-making applications.

Traditional blockchains provide a binary yes or no answer to whether a transaction is valid or not. This disclosure is based on the probabilistic blockchain concept, an extension of the current blockchain paradigm that summarizes decisions and returns probabilistic consensus results. "Probabilistic consensus" is useful in situations where a group needs to decide based on imperfect information or where different members of the group have differing opinions. For example, the question whether the stock market will go up tomorrow has a probabilistic answer rather than a binary yes or no. The approach proposed herein has many anticipated applications including intrusion detections, stock market predictions, insurance, and recommendation systems. The system can connect multiple decision makers in a secured network and make global collaborative decisions without any requirement of a centralized trusted party. The probabilistic consensus can be made at multiple levels of hierarchy, for example, among members of a department, then among multiple departments of a company, and then among multiple companies.

'Distributed ledger' is a generalized name for the blockchain technology. Distributed ledgers are capable of providing highly scalable, provably secure, and decentralized solutions that can benefit many applications. The technology is currently being applied to domains as diverse as financial transactions, healthcare, Internet of Things (IoT), cloud storage, and supply chains, among others.

Figure 1:
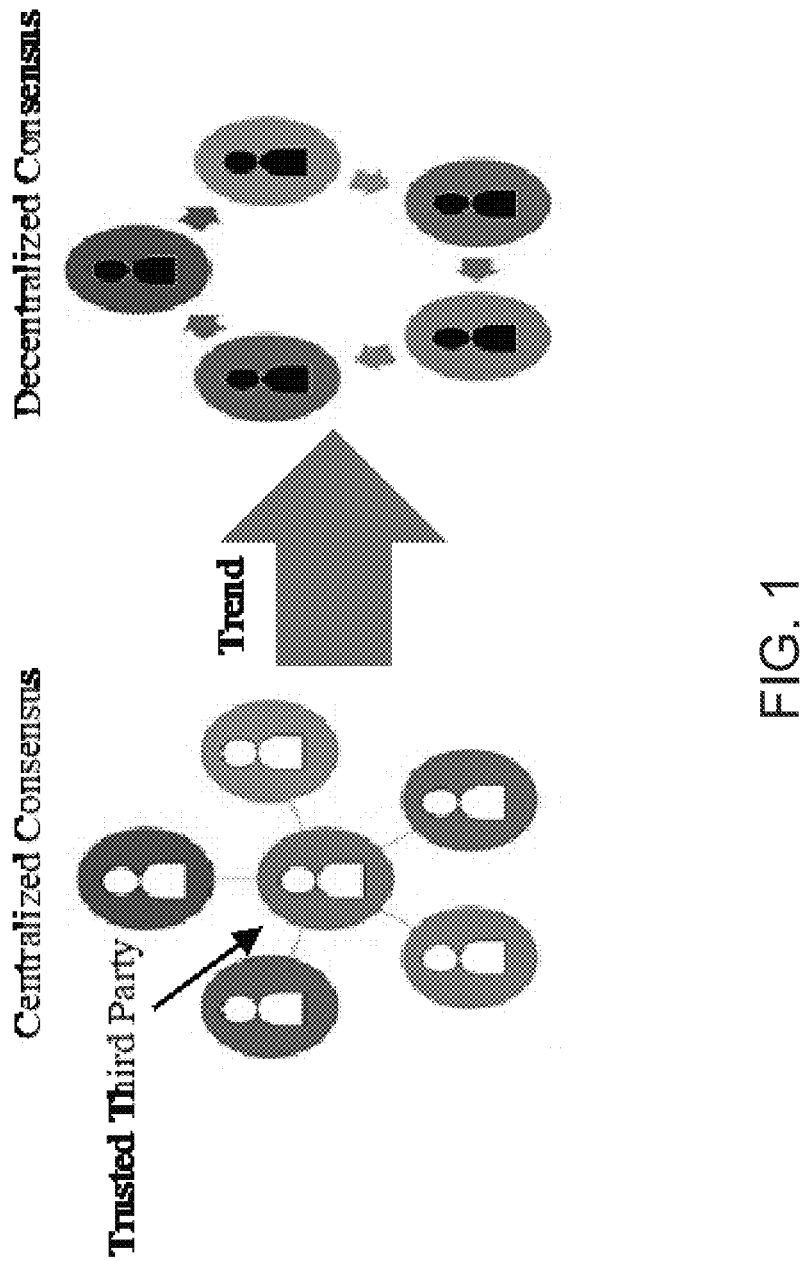
FIG. 1 illustrates a data flow diagram of a transition from centralized to decentralized ledgers in accordance with one embodiment of the disclosure.

Transitions from centralized to distributed ledgers are illustrated in FIG. 1. Note that the main difference in the centralized consensus shown on the left and the distributed consensus shown on the right of FIG. 1 is that the centralized trusted party is not required on the right side.

Probabilistic blockchain technology can be significantly useful in making consensus decisions in multi-trust domain applications. As defined herein, "Consensus decision-making" is a group decision-making process in which group members develop, and agree to support a decision in the best interest of the whole. Consensus may be defined professionally as an acceptable resolution, one that can be supported, even if not the "favorite" of each individual. To make blockchains suitable for these applications the process needs to be extended. Currently, blockchain networks return deterministic results, e.g., whether a money transfer has happened or not. In any decision making application like intrusion detection systems (IDS) or a stock market prediction system and recommendation system, the blockchain technology would need to be extended to process information such that a "consensus decision" can be reached even when the entities have differing "opinions." This requires an extension of blockchains to "probabilistic blockchains," which indicate the probability of occurrence of an event rather than the certainty of it. This kind of probabilistic consensus suits many blockchain applications including the ones that currently use deterministic blockchains.

The terms "decision" and "consensus" while similar are slightly different. The main difference is that the consensus requires two or more parties while the decision can be that of one or more parties. When two or more parties agree on a decision, it can be called the group decision, group consensus, or consensus decision. Thus, a decision is a generalization of a consensus to include groups with single element/member.

The consensus is generally binary: true or false, representing that all agree or that all do not agree. However, there are applications which can proceed without full agreement and so we need to generalize consensus to be non-binary. In this case, some members of the group agree, and some disagree. A further generation is that the consensus does not have to be deterministic, i.e., it can be probabilistic. This is called generalization "probabilistic consensus" or even "probabilistic decision" to denote the fact that this generalization applies to even single-member groups.

Stock market investors need to make such probabilistic decisions every day. Consider a team at an investment organization. Based on the available information, each member of the team decides whether to buy or sell a particular stock. The decisions of various members of the team need to be combined to make a group decision or consensus decision. This consensus decision could be represented by a fraction between 0 and 1 depending on how many members decide one way and how many decide the other way. Thus, the consensus decision can be non-binary. The decision would then translate into actions to buy or sell the stock depending on the risk involved.

As used herein, the terms consensus decision, probabilistic consensus, group consensus, or group decisions, are synonymous. The term "block consensus" is extended to include probabilistic consensus discussed herein.

Automated decision making, or decision automation, in multi-trust domain applications pose considerable research challenges. Consensus decisions need to be made continuously about resource distribution, security assurance, and several other application aspects. Decision makers need to have a global view of the system and sometimes require access to even private information. This is currently done by semi-distributed decision-making platforms such as Adaptive Decision-Making Broker (ADMB). These platforms are geographically distributed and managed. However, critical decisions are made at a centralized global controller (also known as a broker) that is trusted by all system entities. The centralized controller, however, introduces a single point of failure, which is vulnerable to many security risks.

Figure 2:
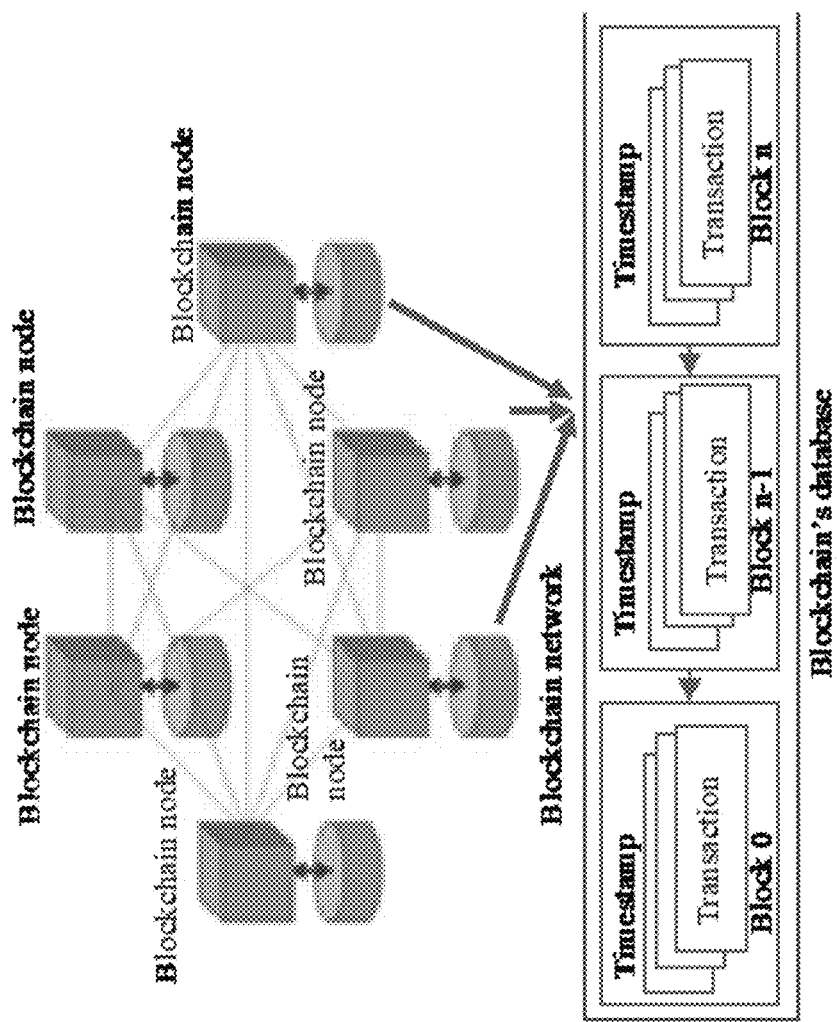
FIG. 2 illustrates an exemplary diagram of blockchain architecture in accordance with one embodiment of the disclosure.

FIG. 2 illustrates an exemplary diagram of blockchain architecture in accordance with one embodiment of the disclosure. A blockchain consists of two main components: a database and a network of nodes, as illustrated in FIG. 2. A blockchain's database is a distributed, shared, tamper-proof and fault-tolerant store that keeps track of records in the form of transactions. Blocks are formed by bundling together a number of transactions, and each block is linked to its predecessor by a hash. A hash is a fixed-length numeric value that uniquely identifies the previous block data. In addition, each block has a timestamp indicating when it was created, a signature proving its correctness and integrity, and a random number (nonce) for cryptographic operations. The signature and nonce allow blocks to be immutable even if publicly accessible. The blockchain's network consists of many distributed nodes that maintain the database in a peer-to-peer network.

Nodes that form the blocks are called "mining nodes" or miners. The nodes that store the database are called "blockchain nodes." The nodes that make transactions or express their decisions in the form of a transaction are called "client nodes." In the decision-making extension presented in this disclosure, the nodes that query the database for a group decision are called "inquiring nodes" while the client nodes that declare their decision are called "agents." Note mining nodes, blockchain nodes, agents, and inquiry nodes are all functions, and more than one function can be implemented in one physical node. Thus, a physical node that is an agent could also be a blockchain node, a mining node, and/or an inquiring node.

The blockchain technology allows nodes to communicate without a trusted broker or a trusted third party. When a node wants to interact with another node, the node sends its interaction in the form of a transaction. Many such transactions are collected to form a block. A block is verified by the blockchain nodes in the network and is added to the chain if it is valid. Otherwise, it is dropped, and the transactions will be recorded in another block. Both transactions and blocks are signed; hence, they cannot be reverted, changed, or denied in the future.

The architecture of blockchain technology yields many appealing characteristics, including distributed management, decentralized consensus, trustless partners, provable security, immutability, and non-repudiation guarantees. Each term is briefly described here. The management is distributed as the blockchain database is replicated at many blockchain nodes and no party has full control over the system. The consensus is decentralized as there is no centralized authority. The trustless partners feature is added as the trust is imposed by a majority rather than by a single controller. Blockchains use sophisticated cryptographic techniques, resulting in security by signature schemes and possible encryption schemes. The blocks are considered immutable as it is virtually impossible to change, delete, or tamper with transactions. Finally, the blockchain provides non-repudiation guarantees due to transactions and blocks being signed using elegant signature schemes.

Blocks in the blockchain can be constructed using several algorithms, which are referred to as mining algorithms. These algorithms allow multiple mining nodes to combine multiple transactions, find a cryptographic hash value with some pre-specified conditions, and construct the resulting blocks to be verified by others. Each verified block is added to the chain, and the miner node that created the block is possibly rewarded. Such rewards can be in terms of money, trustworthiness, or even reputation in the system. Examples of mining techniques include proof of work (PoW), proof of stake (PoS), Practical Byzantine Fault Tolerance (PBFT), proof of space (PoSP), proof of importance (PoI), and measure of trust (MoT). Each of these has certain advantages and disadvantage. For example, PoW is used in Bitcoin. However, PoW is computationally expensive, as it requires a large amount of resources to find a hash value with pre-specified requirements. Other algorithms are simpler regarding computation; however, these algorithms require other forms of resources such as memory or trust level. The invention disclosed herein is independent of the mining technique used and works with all of the mining techniques.

The use of blockchains in multi-trust domain systems has led to blockchain-based voting systems. Such systems are typically multi-trust domains, as voters, candidates, and vote casters do not necessarily trust each other. Blockchain technology can help to track the votes and possibly casting them at the end of the process. In 2015, Bitcoin foundation initiated a new project to build sufficient voting systems that "provide even greater transparency into the voting process, with every vote being recorded on the blockchain." In these voting systems, all votes are deterministic. Voting systems use blockchain as a distributed ledger and a secure recording mechanism only. The work proposed in this disclosure is similar to the voting systems, as in a way the agents "vote" on the decisions made. However, the systems and methods described herein differ from the current blockchain-based voting systems by proposing the probabilistic decisions, extending the concept to other decision-making applications.

The systems and methods herein describe an approach for blockchain-based decision-making processes in multi-trust domain applications. This approach requires extending blockchain concepts to probabilistic blockchains and new proposed metrics to achieve the probabilistic consensus.

To meet the requirements of blockchain-based decision making in multi-trust domains, the technology needs to be extended to reflect local and global decisions precisely. The objectives of the current blockchain mechanisms are to verify transactions and blocks and to check for simple local decisions, such as whether a transaction is in the database or not. In other words, combining of multiple transactions' data when the blocks are created is not done in the current blockchain implementations. Further, the blockchain results are deterministic in terms of 'yes' and 'no' without assurance or confidence guarantees. However, for most decision-making applications, the inquiring nodes need to know the accuracy and confidence level of the returned results. For example, in stock market predictions, the inquirers need to know how precise the returned value is, how many agents participated in the prediction, and so on. That is, to use blockchains for decision making, blockchains' transactions and blocks should be extended to include more precise information that reflects the probabilities and the level of uncertainty. Further, the consensus to achieve decisions should be introduced.

The probabilistic blockchain reflects the probability and confidence of agents that participated in a particular decision. The probabilistic result is produced instantaneously when the block is created rather than whenever requested. Further, uncertainty measures can be added to reflect the results' variability. One having ordinary skill in the art would understand that the systems described herein do not prescribe a particular method to summarize the result or the variability. The systems described herein can be used with any appropriate functions that summarize the decisions.

Transactions submitted by the blockchain agents include a probabilistic decision which can be any fraction in the range [0, 1]. The decision could also be deterministic in cases where an agent returns 0 or 1 with full confidence. Different agents may inspect the same event and may return differing local decisions. Then, miners form a block summarizing multiple transactions from multiple agents and create a consensus decision about the inspected event. For example, in a stock market prediction application, different agents would decide if the market will go up or down. Mining nodes would summarize agents' decisions for each market or even individual stock. This summary represents an interpretation of the whole system about that market. Hence, the summary can be considered as a consensus value that the system agrees on. Any appropriate function may be used to summarize the consensus. These can include but are not limited to, taking the mean or mode, a moving average, a weighted average, a fuzzy weighted average, first moment, second moment, $n^{th}$ moment, or the result of a sophisticated machine learning algorithm. That is, the summary or consensus function for the stock market prediction example can be as follows:

$$P(Stock_i \text{will rise}) = G(P_j((Stock_i \text{will rise}))) \qquad \text{Eq. 1}$$

Here $Stock_i$ is the stock to be predicted, and Pj is the $j^{th}$ agent's decision function for whether $Stock_i$ will rise.

The summary does not have to be a single number. It can be a vector or even multidimensional matrix. For example, the summary may include a vector with the mean, standard deviation, confidence interval, skewness, kurtosis, and higher-order moments and other probability measures. Generally, the summary should also include the number of agents that participated in achieving consensus. As a matter of fact, this summary is application dependent, and that is why any appropriate function is allowed.

In this disclosure, the stock market prediction is used to illustrate probabilistic blockchains. However, the systems described herein may be applied to any decision-making system. This example predicts if the stock is going up or down. Thus, a binary decision of the stock price rising ("1")

or declining ("0") is used for illustration purposes. In these examples, the average is used as a simplified summary function (i.e., consensus value or the G function in Eq. 1). That is, for this disclosure example, blocks will have a consensus of the results as follows:

$$P(Stock_i \text{ will rise}) = \Sigma w_j * P_j(Stock_i \text{ will rise}) \quad \text{Eq. 2}$$

If there are n agents, each with equal weight, $w_j$ would be 1/n and Eq. 2 will map to the average over all of the agents. Furthermore, $P_j$ in this specific case is '0' or '1' but generally can be any probabilistic value or vector. Also, this is a simplified stock market prediction case which involves only two decision options. However, this can be extended to any number of choices and applied to other applications.

Probabilistic consensus for a specific event is simply the summarized value/vector in the last block that had that event. This value/vector represents the collective probability for that event. For example, if a specific stock is believed to rise or decline tomorrow. Therefore, this consensus is referred to as probabilistic consensus.

In this way, all transactions, blocks, and consensus returned by the probabilistic blockchain can be probabilistic. Further, a summary of the transactions is included in each block for fast recovery of any consensus decision required.

Figure 3:
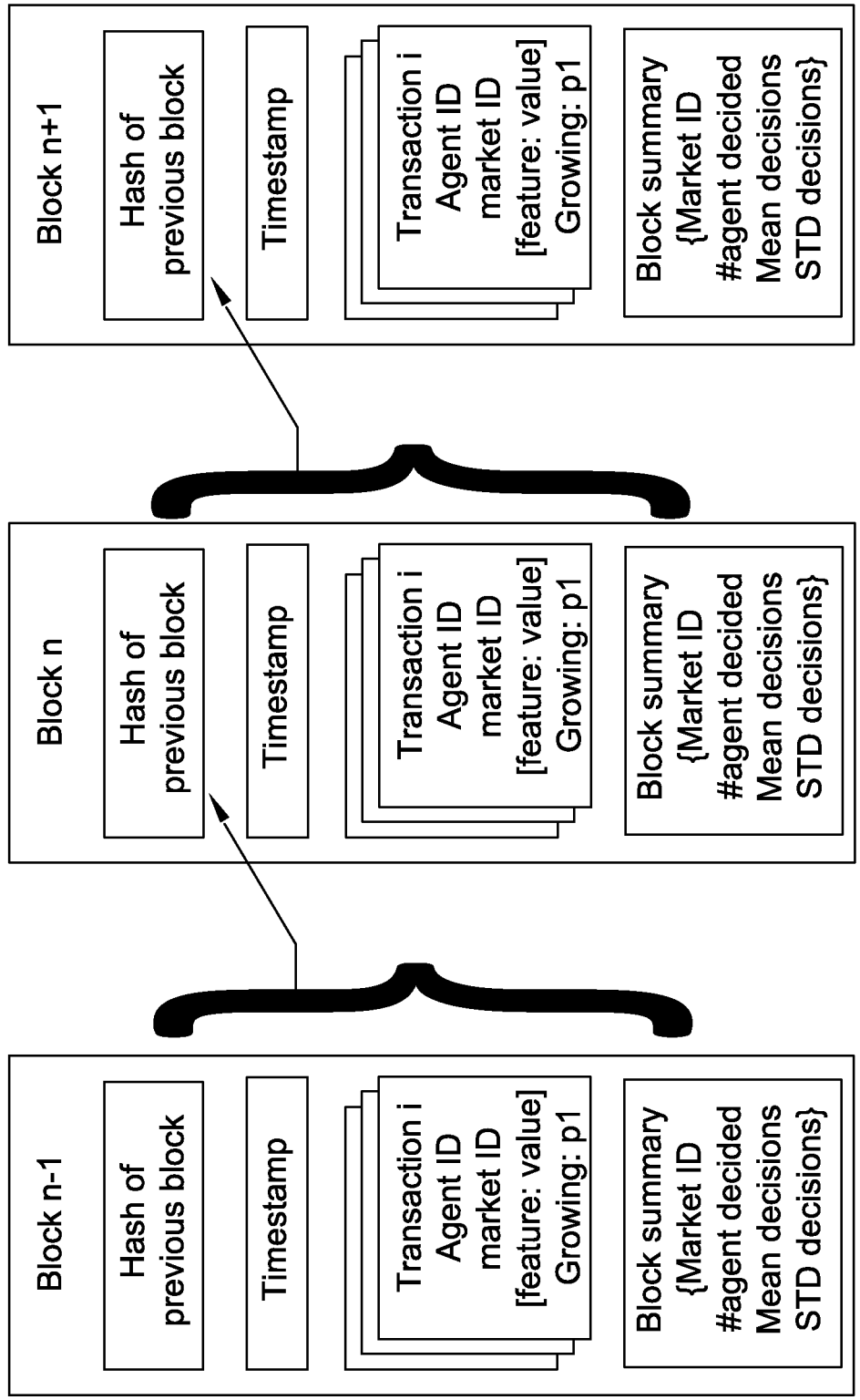
FIG. 3 illustrates an exemplary diagram of a proposed transaction and block architecture in accordance with one embodiment of the disclosure.

The proposed architecture for the probabilistic blockchain is similar to traditional blockchains where blocks contain transactions and are linked in a chain. Each transaction represents an agent's decision for a specific event, and each block includes consensus decisions made for that event. The blockchain-based stock market prediction example and its architecture are illustrated in FIG. 3. Transactions are each agent's conclusion/decision on a stock rising or not at a given time. Each transaction has the agent's ID, stock ID, agent's signature, and his decision to be recorded. In this example, the features that led the agent to that decision are also included. Sample features could be political news or the market history over the past few days. Then, miners will summarize the decisions for each stock included in the block by mean, standard deviation, and other measures.

Each block contains the transactions in that block which are of variable length. Also, multiple stocks can be predicted in the same block. Therefore, a block can be of variable length decisions made for several stocks. That is, a block may have a summary of one or many events depending on the transactions available at the time.

The challenge in achieving group consensus is that the transactions for the same event may arrive at the miners at different times. This results in these transactions being distributed over multiple blocks. Therefore, updating the consensus value and reaching a finalized consensus is a challenge.

To resolve the first challenge, i.e., updating the consensus value, the miner gets the summary from the last block that had the same event, adds the new transactions, and creates a new summary in the new block. This requires that the summarizing function be such that it can be incrementally computed. The search for the last transaction that included the target event might be challenging and time-consuming. Fast search algorithms can be used to resolve this challenge.

The second challenge, reaching a finalized consensus, is harder to resolve as agents could be sending their transactions for a specific event at different times. Two alternatives to resolve this second challenge are provided herein. In the first alternative, the decisions are assumed to be final after a certain number of blocks have been constructed. This could be imperfect if the difference in time for the transactions of the same event is too long. The other alternative is to give the latest consensus value which can be updated as the system progresses in time. The specific decision among the alternatives is application dependent, and different decisions can be made by the application developer to resolve this issue.

Mining techniques have minimal effect on blockchain-based decision making. The primary requirement is to be able to summarize the results without controlling the system. Thus, any mining technique that is justifiable can be used. Several mining techniques have been mentioned above.

The probabilistic blockchain works just like the traditional blockchains. However, there are some minor differences that need to be taken care off. Namely, how the system would work given that the workflow is different for decision-making applications. During the discussion below, the assumption is that mining nodes, blockchain nodes, and decision-making agents are different. However, it should be noted that a node could be an agent, a mining node and/or a blockchain node if it has the capability.

Figure 4:
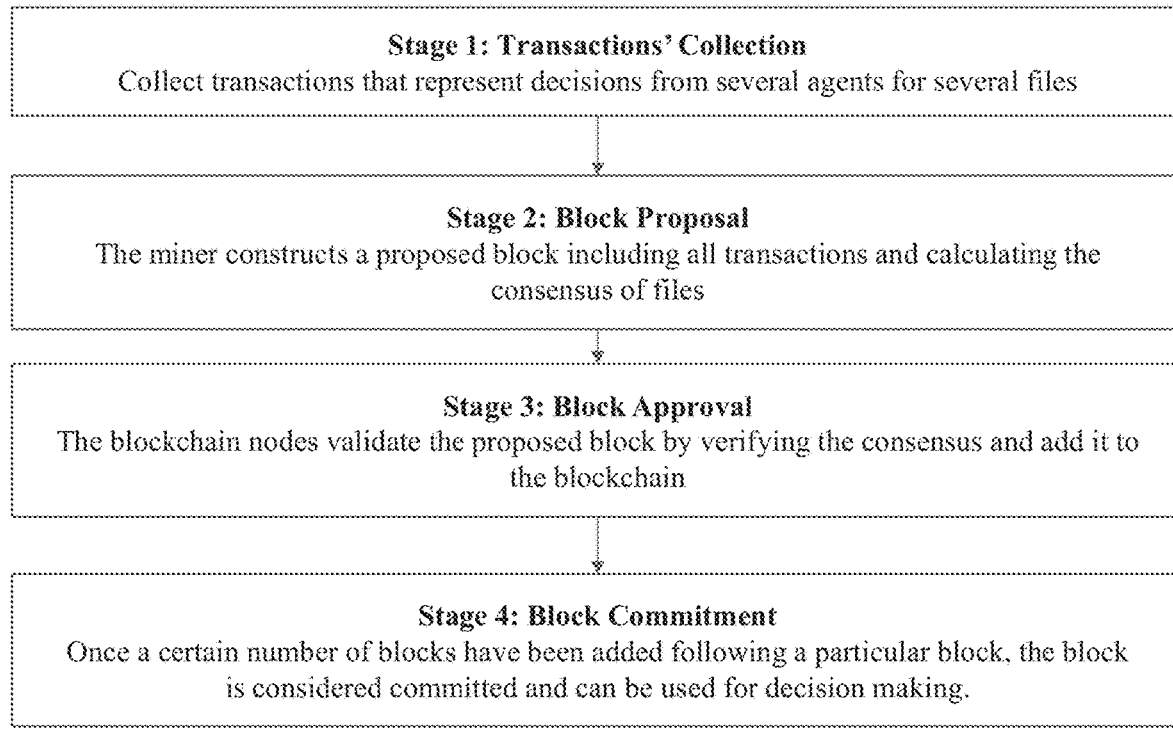
FIG. 4 illustrates an exemplary workflow for the proposed probabilistic blockchains in accordance with one embodiment of the disclosure.

The workflow, as illustrated in FIG. 4, is composed of 4 stages: i) transactions' collection, ii) block proposal, iii) block approval, and iv) block commitment.

In the first stage, transactions' collection, a transaction is initiated by an agent that has the capability to decide on a certain event, e.g., a specific stock prediction. This agent will broadcast its transaction to the blockchain network. In fact, many other agents will make their own decisions about the event and broadcast their own transactions as well.

In the second stage, block proposal, the mining nodes construct the blocks. Block construction in most blockchain's implementation is time triggered. The mining nodes should check recent past blocks to verify if the event is present in them. This ensures reaching a correct consensus value, in case some decisions were made about the event in a previous block. The proposed block has transactions for several events, and each event includes several transactions that help make a decision for it. This block is submitted to the blockchain network. However, it is not committed to the chain as it is not verified yet.

In the third stage, block approval, blockchain nodes in the network that store the blockchain validate each proposed block to make sure that all transactions are valid and that the probabilistic consensus in the block is correct. If the block is valid, it is added to the local chain following the block it points to and is forwarded to the other blockchain nodes in the network.

Initially, the chain has many branches at the end as different blocks received point to different previous blocks. After a while, short branches are discarded (pruned) since most nodes in the network did not follow those branches. This is similar to the traditional blockchains.

After a block is committed to the blockchain, any inquiring node can check the summary or the system-wide consensus made for the requested event. Further, the consensus can be accessed by any other node for future use or consultancy. Future events that are submitted to the blockchain should have a unique ID to distinguish them from the previously submitted events.

The proposed blockchain-based decision-making approach provides several security benefits. These include resiliency to malicious agents, resiliency to malicious miners, Distributed Denial of Service (DDoS) protection, and fraud mitigation.

The proposed blockchain-based solution is resilient against malicious nodes that try to take control over the application. In a centralized solution, compromising the trusted centralized node leads to the decision process failure.

For example, in stock market predictions, if one centralized node is summarizing the predictions, then controlling that node will control the decision. Similarly, in semi-distributed management architecture, compromising the centralized controller or broker will break the whole system. In contrast, a blockchain-based design is hard to break and is resilient against malicious actors. The following example illustrates a proof of this resiliency.

Analysis 1: The probabilistic blockchain is resilient against malicious actors that try to manipulate the consensus decision such that the interpretation of the decision by the blockchain is flipped.

Note that manipulation of the consensus value by a small amount cannot be prevented, however, the consensus value cannot drastically change such that the decision is flipped.

Consider a stock i which is being inspected by agent j. Agent j broadcasts a transaction $T_j$ which is summarized as follows:

$T_j$: {agentID:j,StockID:i,features:[ ],rise:1}

Here the agent has detected that the stock price will rise and she is sending a deterministic 1 as a decision. Assuming m agents forecasting the same stock, transactions {T1, . . . , Tm} will be sent to all the mining nodes in the blockchain. If all the agents give the same decision, a mining node will construct the block with stock i consensus as follows:

{StockID:i,#agents:m, mean:1,stdv:0}

This indicates that the blockchain concluded that stock i is going to rise with 100% probability. Now, assuming that there are n malicious agents, where n<m/2, e.g., n=0.2 m. This means that 20% of the agents are malicious and send transactions with flipped decisions. That is, if agent g is malicious, the following transaction $T_g$ will be sent:

$T_g$:{agentID:g,StockID:i,features:[ ],rise:0}

Now, the mining nodes will have m agents participating in the consensus: 80% of them are giving correct decisions "1" while 20% are giving wrong decisions "0". Consequently, stock i consensus will be:

{StockID:i,#agents:m,mean:0.8,stdv:0.4}

The stdv (standard deviation) here is slightly dependent on how many agents are involved, but it would be close to 0.4.

This indicates that the blockchain concluded that stock i price is about to rise with 80% probability instead of 100% in the no-adversary case. This is still a high probability value. Thus, stock i will still be interpreted as a rising stock.

Thus, even as large as 20% agents turning rogue does not make any significant difference to the decision. Assuming that the system has 1000 agents participating in the decision, this 20% will map to 200 faulty or malicious agents. It is difficult to compromise these many agents, compared to compromising the one party that is done in traditional centralized systems.

Actually, in this example, the probabilistic consensus effect has a linear relationship with the number of malicious nodes and the adverse impact would be felt after 500 or more nodes become malicious.

The mining is resilient against malicious miners that try to manipulate the decisions by either generating random transactions or reporting incorrect consensus. This is true because its block will be different from those computed by other miners. The malicious block will eventually be pruned as in traditional blockchains. The present blockchain-based solutions described herein can protect decision systems from DDoS attacks, which are considered the most threatening attacks on the Internet. In DDoS attacks, a set of attackers targets the availability of the system by sending too many requests to be processed. In a centralized or semi-distributed architecture, this can be done by targeting the centralized controller. However, in a blockchain distributed design, the DDoS attack is made harder as there is no single point of vulnerability. DDoS attacks can cause the loss of billions of dollars in decision-making applications such as stock market predictions or other financial applications. Put another way, the protection provided by this approach can guarantee the availability of the system against DDoS attacks and prevent losses worth billions of dollars.

The present blockchain architecture described herein can prevent fraudulent attacks; and thereby, help applications in keeping the integrity and correctness of current and prior decisions. A fraudulent attack tries to manipulate the data or decisions, that is, break the integrity of the decisions and prevent the detection of such infringement. This is done by compromising the storage and has been traditionally avoided by replications and signature schemes. However, traditional solutions come with an added cost since they are provided as an external service. On the other hand, blockchains offer fraud mitigation guarantees by design, since blocks and transactions in the chain are already signed and replicated in many blockchain nodes. This leads to immutability in blockchain-based solutions, which makes it extremely difficult to alter or manipulate the data.

Next, some applications that can use the probabilistic blockchains are discussed. The possible applications that can benefit from probabilistic blockchains described herein do not comprise a complete list. In fact, any application that is possible with current blockchain technology can benefit from the probabilistic blockchains by having a concise and meaningful result.

In the stock market prediction application, agents predict whether the stock would rise or fall and the value by which the market will change. This prediction can be based on historical data, recent political news, or the geographic location of the predictor. In any case, different agents give their decision (prediction), and the blockchain achieves its consensus about the market. This helps inquiry nodes make conscious decisions about buying, selling or holding their shares in that specific stock. Probabilistic consensus, for example, could be based on the first moment (arithmetic mean) as discussed earlier. Alternatively, the weighted average, where agents are weighted based on their past performance, may give a more precise prediction. It should be noted that the stock market requires fast decisions as the investors may lose millions in a few seconds. Therefore, the probabilistic and on-the-go decisions proposed herein are expected to suit the requirements for such applications.

In a collaborative intrusion detection system (IDS) based on probabilistic blockchains, multiple agents participate in deciding whether a flow (i.e., network traffic) is malicious or not. The collaborating IDS agents could be globally distributed, may follow different detection mechanisms, and may be owned by various governments, institutions, or enterprises. They are not even required to have mutually trusting relationships. Probabilistic blockchains allow the agents to reach consensus without sharing sensitive attack information. More importantly, the possibility of having a zero-day attack (a previously unknown attack) is reduced in the system as new attacks to one system might not be new to others.

Blockchain-based approaches can help build better recommendation systems for any asset, such as hotels or products. Many approaches to distributed recommendation systems have been proposed, and many websites are following these approaches. The problem with these approaches is that they involve a trusted third-party or a broker that collects the data and makes the decisions. This imposes a trust issue as recommenders are competing and, therefore, are not motivated to share their datasets with others. On the other hand, in the probabilistic blockchain approach recommenders only share their final decisions. To illustrate the suitability, consider a hotel recommendation application or hotel rating application. Agents in this application can be Expedia, Trivago, Booking.com, Hotels.com and so on. As can be noted, these agents do not trust and possibly compete with each other. In the probabilistic blockchain approach, agents would give their recommendations, and a consensus would be made about the hotel rating. Further, a weight could be assigned to each agent based on its past prediction performance or its reputation.

In addition to aiding trustless probabilistic decision making, probabilistic blockchains can act as systematic feedback for reinforcement learning applications. Reinforcement learning is a type of machine learning that builds models by taking action and receiving feedback from the system. Each action moves the system to a particular state, and the feedback comes from system experts regarding reward/punishment for the specific action. In this way, the model learns adaptively according to the feedbacks and rewards from the system environment. If the decision made by the agent is extremely different from the consensus, the model is updated. If the decisions match, the model is updated to reflect this new knowledge. In both cases, the model is updated so that the decisions of the models will match more often in the future.

The following example illustrates the use of probabilistic blockchains in building blockchain-based IDS. The example presents the blockchain setup, the datasets, the algorithms used, the evaluation metrics, and the example results.

IDS is a decision-making application that is similar to stock market prediction in the sense that it can utilize machine learning to make predictions and the decisions are binary yes or no. Thus, the examples shown can be applied to stock market prediction or any other economic knowledge automation applications.

In this example, there are 1,000 agents, five miners, one inquirer, and four blockchain nodes, to form a blockchain network. Agents make decisions that are submitted to the blockchain as transactions. Note that in IDS case, a positive decision ("1") indicates that the flow has been classified as malicious (an attack is detected) while a negative decision ("0") implies normal traffic. Then, the mining nodes calculate the probabilistic consensus and form the blocks as illustrated in FIG. 3. Probabilistic consensus for this specific example is the arithmetic mean of the decision made by agents. A mapping of the probabilistic consensus to malicious or non-malicious flow is needed to evaluate the system. To do so, a flow is determined to be malicious if more than 50% of the agents say so. In other words, if the probabilistic consensus is more than 0.5, then the flow is declared malicious. Otherwise, the flow is normal.

While the example described herein is a simplified example, a more sophisticated decision-making process may be used. The threshold (taken as 0.5 here) is application and attack type dependent. As an example, financial applications may not tolerate attacks that affect their availability. They may accept some false alarms but need very low Denial of Service (DoS) attack detection misses. Hence, the threshold, in this case, could be as low as 1% or 0.1%. In other words, it is up to the application developers to consider the appropriate decision-making thresholds for their applications.

The dataset used is composed of 9 types of attacks in addition to standard flows. For this example, only one type of attack is viewed, i.e., detecting DoS attacks. However, the systems described herein could also view multiple different types of attacks based on the models used.

In these examples, three detection models are used based on different machine learning algorithms and the same training dataset. Namely, the three detection models are built using logistic regression (LR), random forest (RF), and decision trees (DT). These models are distributed randomly among the 1000 agents, who use them to make decisions about the received flows. Probabilistic consensus values are used to decide if there is a DoS attack. Then, the probabilistic consensus decision made using blockchains along with the decisions made by the learning models are used to evaluate the proposed approach.

The following four measures are used to derive the evaluation metrics described in the next paragraph: false negatives (FN), false positives (FP), true negatives (TN), and true positives (TP). These metrics are constructed from the confusion matrix of the predicted array versus ground truth array. In the IDS context, FN represents the number of malicious flows falsely detected as normal. FP is the number of normal flows incorrectly identified as malicious flows. TN indicates the number of correctly classified normal flows while TP represents the number of correctly classified as malicious flows. Table I summarizes these metrics for IDS.

TABLE I

Confusion matrix in IDS context

| Data class | Classified as normal | Classified as malicious |
|---|---|---|
| Normal | True Negative (TN) | False Positives (FP) |
| Malicious | False Negatives (FN) | True Positives (TP) |

The chosen metrics to evaluate the proposed approach are accuracy, false alarm rate (FAR), and un-detection rate (UND). These metrics are used in evaluating any machine-learning model or even any decision-making process. Accuracy is the most frequently used metric for evaluation. It measures the degree of correctness of the predicted values to the overall number of samples. That is, $$\text{Accuracy \%} = \frac{TP + TN}{TP + TN + FP + FN} * 100\% \quad \text{Eq. 3}$$

FAR is another metric that measures the ratio of normal flows that are detected as malicious flows. That is, the ratio of false detected attacks, which can be represented by:

$$FAR \% = \frac{FP}{FP + TN} * 100\% \quad \text{Eq. 4}$$

In contrast, UND is the metric that measures the ratio of malicious flows that are not detected by the model. That is:

$$UND \% = \frac{FN}{FN + TP} * 100\% \quad \text{Eq. 5}$$

Figure 5:
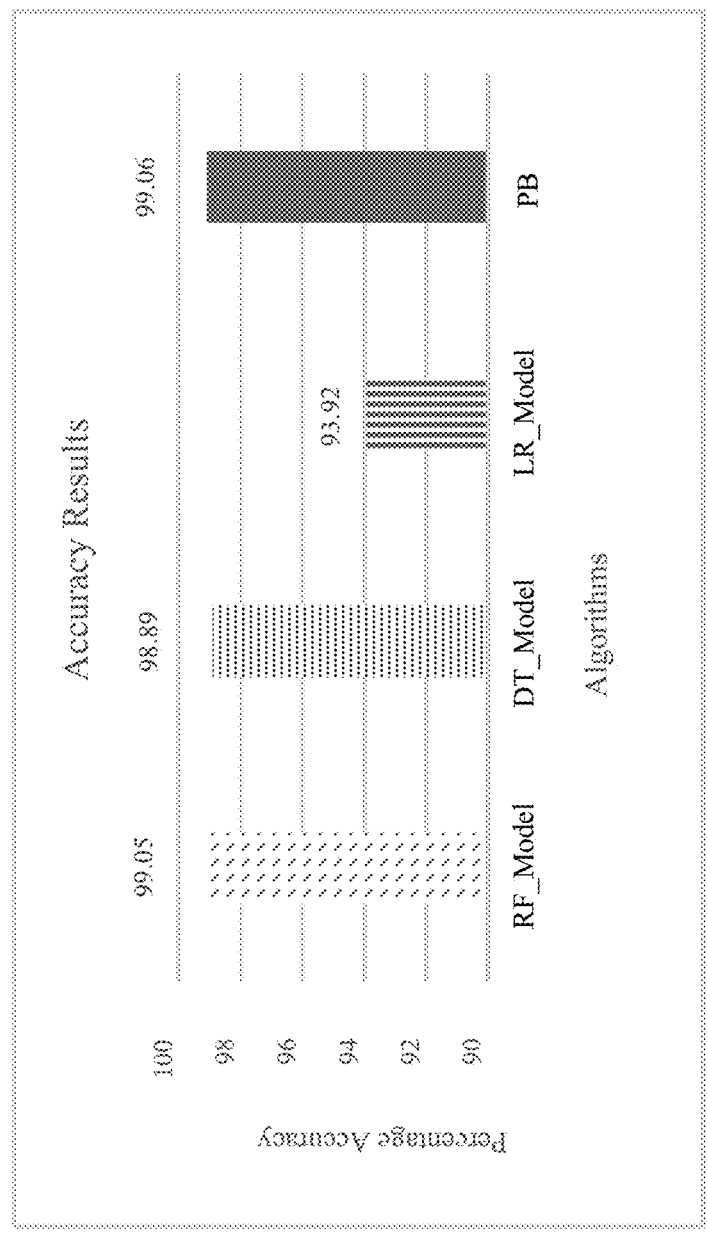
FIG. 5 illustrates a graph of the accuracy results of the intrusion detection system (IDS) use case.

In terms of accuracy, the proposed approach shows a performance similar to the best machine learning model. The example results of the three models in addition to probabilistic blockchain (PB) results are shown in FIG. 5. As can be seen, the RF model, the DT model and the probabilistic blockchain (PB) have a high accuracy while the LR model has a relatively bad performance. PB has the highest accuracy compared to other models which indicates the feasibility of the proposed approach. However, accuracy is not enough to fully understand the model performance.

Figure 6:
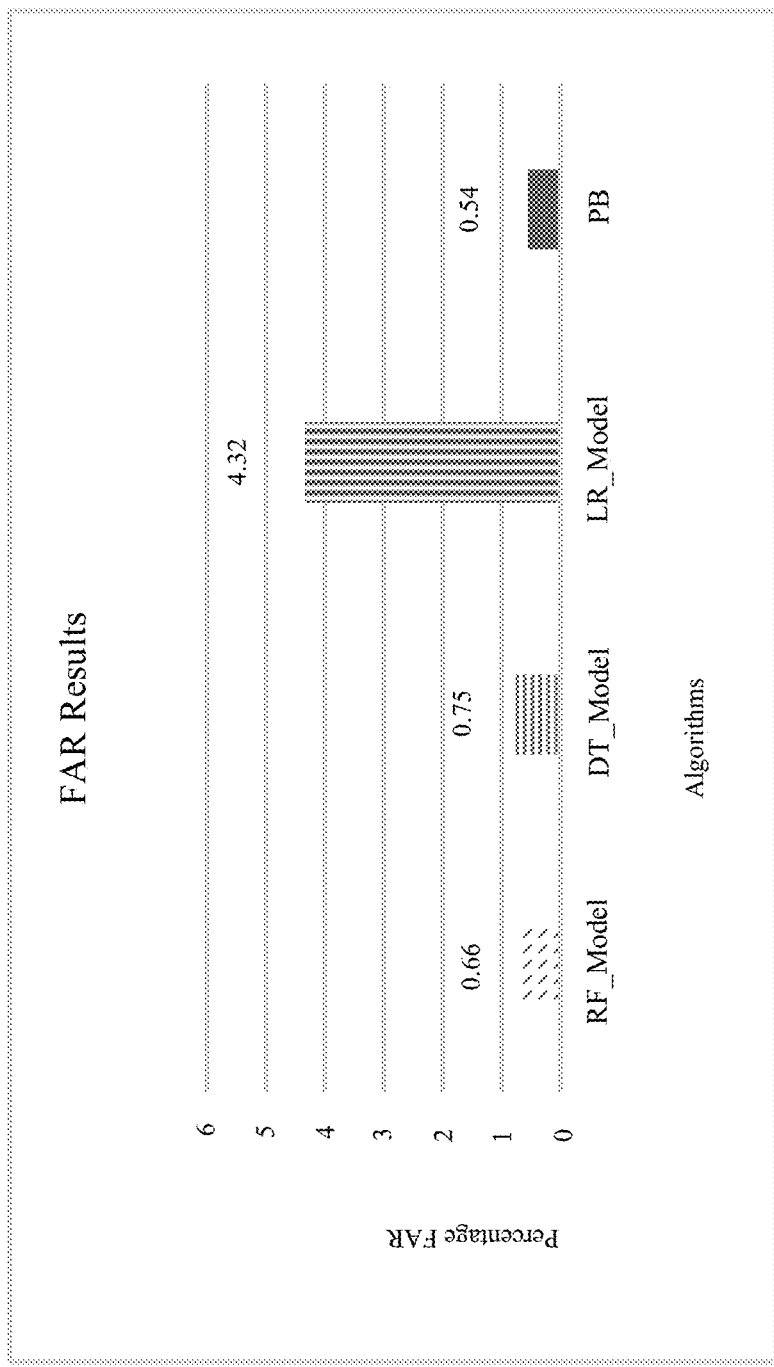
FIG. 6 illustrates a graph of the false alarm rates (FAR) results of the IDS use case.

The example FAR results show that the proposed model is resilient against poorly performing models as long as they are not used by more than half of the agents. The results of the example scenario are shown in FIG. 6. In this case, lower the value of FAR, the better is the model. As can be seen, PB outperforms others while RF and DT models perform relatively well. The LR model performs poorly compared to others. However, the proposed model was not affected by this bad performance.

Figure 7:
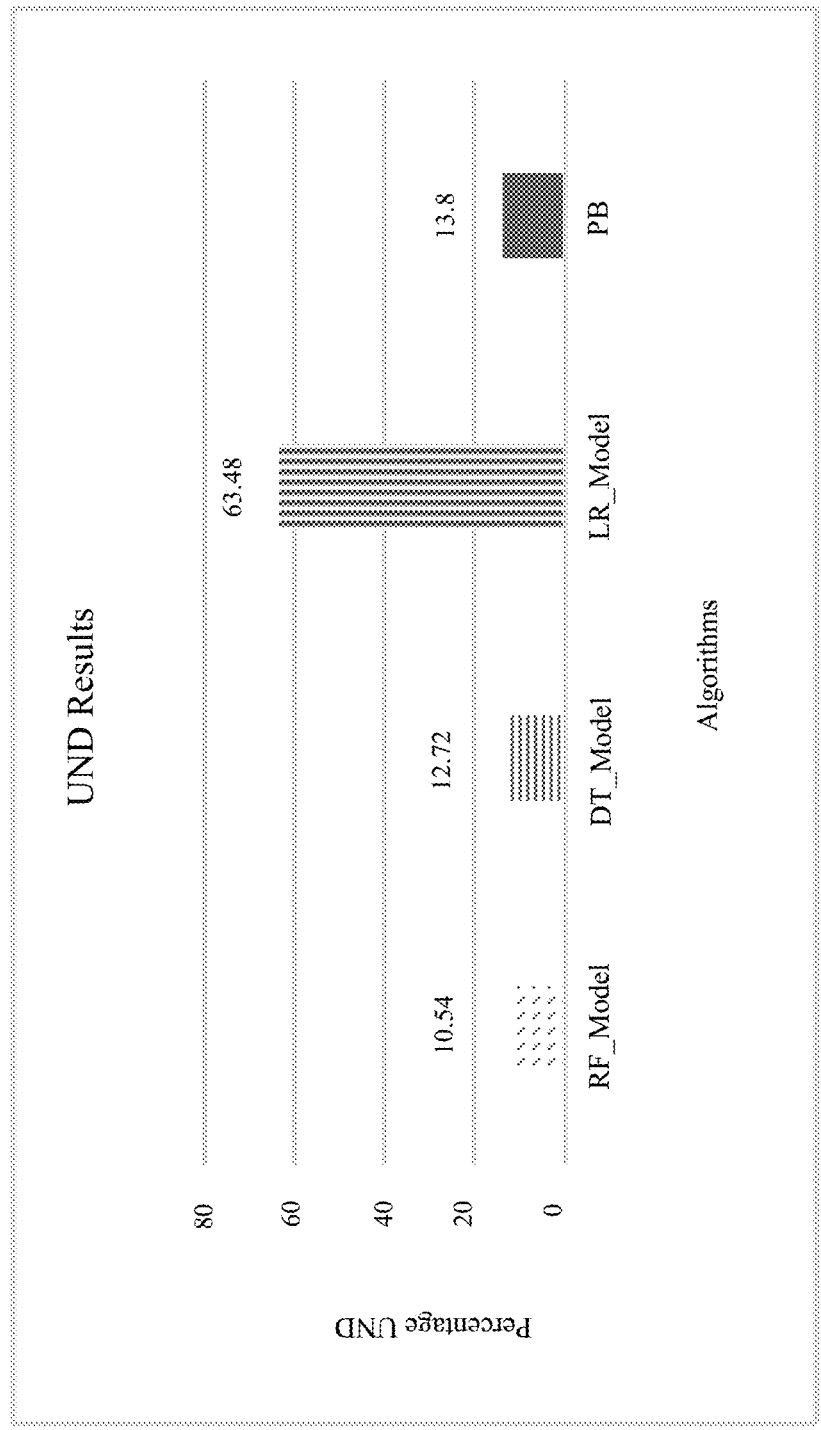
FIG. 7 illustrates a graph of the undetection rate (UND) results of the IDS use case.

In regard to UND, the proposed approach shows comparable performance to the best performing machine learning models. The results are illustrated in FIG. 7 which shows that PB had a rate that is slightly higher. This means that the model was not performing as well as the best in this specific case, but the performance is still very good. This degraded performance resulted from a majority (two of RF, DT, and LR) making wrong predictions. In other words, if two third of the agents wrongly predict a sample, then PB will predict wrongly as well. LR performed much worse than others, and this shows that the proposed approach performs well and has the resiliency to poor predictors.

The example results show that the probabilistic consensus model has a performance that is comparable to the best performing machine-learning model presented. The results also show that the proposed algorithm would fail to give correct results with cases in which a majority of the agents give wrong predictions.

In summary, blockchain technology provides a secure, consensus-based distributed platform with a large number of potential applications. However, extensions are required to make them suitable for decision-making applications. In this disclosure, the probabilistic blockchain, an extended blockchain concept, is described for decision-making applications in multi-trust domains. The proposed approach is advantageous over traditional decision making approaches in that is more secure as it is resilient to malicious nodes and miners and provides DDoS protection and fraud mitigation. Another advantage is that it has a large application footprint that includes IDS, stock market prediction and recommendation systems. The described systems and methods are suitable for many decision-making or automation applications, especially those in multi-trust domains.

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving media, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps," or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object-oriented databases, and any other structured or unstructured collection of records or data that is stored in a computer system. The above examples are not intended to limit in any way the definition and/or meaning of the term database. Examples of RDBMS's include, but are not limited to, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In another embodiment, a computer program is provided, and the program is embodied on a computer-readable medium. In an example embodiment, the system is executed on a single computer system, without requiring a connection to a server computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, Calif.). In yet a further embodiment, the system is run on a Mac OS® environment (Mac OS is a registered trademark of Apple Inc. located in Cupertino, Calif.). In still yet a further embodiment, the system is run on Android® OS (Android is a registered trademark of Google, Inc. of Mountain View, Calif.). In another embodiment, the system is run on Linux® OS (Linux is a registered trademark of Linus Torvalds of Boston, Mass.). The application is flexible and designed to run in various different environments without compromising any major functionality.

In some embodiments, the system includes multiple components distributed among a plurality of computer devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "example embodiment," "exemplary embodiment," or "one embodiment" of the present disclosure are not intended to be interpreted as excluding the existence of additional embodiments that also incorporate the recited features.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for adding blocks to a probabilistic blockchain, the system comprising a mining computer device comprising at least one processor in communication with at least one memory device, the mining computer device in communication with a plurality of node computing devices, the at least one memory device including instructions, which when executed by the at least one processor the instructions cause the at least one processor to:

receive a plurality of transactions from a plurality of agent computer devices each associated with an agent, wherein each transaction of the plurality of transactions includes a decision rating, and wherein each transaction is associated with a first decision;

associate a weight with each of the plurality of agents;

generate a summary of the first decision based on the plurality of decision ratings and the plurality of weights associated with the plurality of transactions;

generate a block based on the summary and the plurality of transactions;

transmit the block to the plurality of node computing devices for verification; and if the block is verified, add the block to the probabilistic blockchain.

2. The system in accordance with claim 1, wherein the instructions further cause the at least one processor to:

receive one or more additional transactions associated with the first decision, wherein the one or more additional transactions are associated with one or more agents separate from those of the plurality of agents;

retrieve the summary from the block;

update the summary based on one or more decision ratings associated with the one or more additional transactions; and generate a new block based on the updated summary and the one or more additional transactions.

3. The system in accordance with claim 2, wherein the instructions further cause the at least one processor to:

count a number of blocks between a current block and the new block with a last updated summary; and when the number of blocks exceeds a predetermined threshold, finalize the first decision based on the updated summary.

4. The system in accordance with claim 2, wherein the instructions further cause the at least one processor to:

count a number of blocks between a current block and the new block with a first summary for the first decision; and when the number of blocks exceeds a predetermined threshold, finalize the first decision based on the updated summary.

5. The system in accordance with claim 1, wherein each weight is assigned to each agent based on at least one of past performance and a reputation of the corresponding agent.

6. The system in accordance with claim 1, wherein the instructions further cause the at least one processor to generate the summary based on any statistical characteristics, including at least one of a mean, a mode, a moving average, a weighted average, a fuzzy weighted average, first moment, second moment, nth moment, or a machine learning algorithm.

7. The system in accordance with claim 1, wherein the decision rating illustrates a corresponding agent's opinion on the first decision.

8. The system in accordance with claim 7, wherein the decision rating is one of a binary value, a probabilistic value, and a vector.

9. The system in accordance with claim 1, wherein each transaction includes an agent's identifier, a decision identifier, an agent's signature, and the agent's decision rating for the first decision associated with the decision identifier.

10. The system in accordance with claim 1, wherein the first decision is associated with any risk including at least one of a stock market prediction, a stock price prediction, an intrusion detection system, etc.

11. A system for adding blocks to a probabilistic blockchain, the system comprising a mining computer device comprising at least one processor in communication with at least one memory device, the mining computer device in communication with a plurality of node computing devices, the at least one memory device including instructions, which when executed by the at least one processor the instructions cause the at least one processor to
- receive a first plurality of transactions from a first plurality of agent computer devices each associated with an agent, wherein each transaction of the first plurality of transactions includes a decision rating, and wherein each transaction of the first plurality of transactions is associated with a first decision;
- generate a first summary of the first decision based on the plurality of decision ratings and a plurality of weights associated with the first plurality of transactions;
- receive a second plurality of transactions from the first plurality of agent computer devices, wherein each transaction of the second plurality of transactions includes a decision rating, and wherein each transaction of the second plurality of transactions is associated with a second decision;
- generate a second summary of the second decision based on the plurality of decision ratings and a plurality of weights associated with the second plurality of transactions;
- generate a block based on the first summary, the second summary, the first plurality of transactions, the second plurality of transactions, and the plurality of weights;
- transmit the block to the plurality of node computing devices for verification; and
- if the block is verified, add the block to the probabilistic blockchain.

12. A method for adding blocks to a probabilistic blockchain comprising:
- receiving a plurality of transactions from a plurality of agent computer devices each associated with an agent, wherein each transaction of the plurality of transactions includes a decision rating, and wherein each transaction is associated with a first decision;
- associating a weight with each of the plurality of agents;
- generating a summary of the first decision based on the plurality of decision ratings and the plurality of weights associated with the plurality of transactions;
- generating a block based on the summary and the plurality of transactions;
- transmitting the block to a plurality of node computing devices for verification; and
- if the block is verified, adding the block to the probabilistic blockchain.

13. The method in accordance with claim 12 further comprising:
- receiving one or more additional transactions associated with the first decision, wherein the one or more additional transactions are associated with one or more agents separate from those of the plurality of agents;
- retrieving the summary from the block;
- updating the summary based on one or more decision ratings associated with the one or more additional transactions; and
- generating a new block based on the updated summary and the one or more additional transactions.

14. The method in accordance with claim 13 further comprising:
- counting a number of blocks between a current block and the new block with a last updated summary; and
- when the number of blocks exceeds a predetermined threshold, finalizing the first decision based on the updated summary.

15. The method in accordance with claim 13 further comprising:
- counting a number of blocks between a current block and the new block with a first summary for the first decision; and
- when the number of blocks exceeds a predetermined threshold, finalizing the first decision based on the updated summary.

16. The method in accordance with claim 12 further comprising generating the summary based on at least one of a mean, a mode, a moving average, a weighted average, a fuzzy weighted average, first moment, second moment, nth moment, or a consensus function.

17. The method in accordance with claim 12, wherein the decision rating illustrates a corresponding agent's opinion on the first decision and wherein the decision rating is one of a scalar fixed value, a probabilistic value, or a vector.

18. The method in accordance with claim 12, wherein each transaction includes an agent's identifier, a decision identifier, an agent's signature, and the agent's decision rating for the first decision associated with the decision identifier.

19. The method in accordance with claim 12, wherein each weight is assigned to each agent based on at least one of past performance and a reputation of the corresponding agent.

* * * * *